March 18, 1952  B. W. PIKE  2,589,860
ALTITUDE INDICATOR SYSTEM
Filed Dec. 10, 1945

INVENTOR
BEUHRING W. PIKE
BY
William D. Hall.
ATTORNEY

Patented Mar. 18, 1952

2,589,860

UNITED STATES PATENT OFFICE 2,589,860

ALTITUDE INDICATOR SYSTEM

Beuhring W. Pike, Watertown, Mass., assignor, by mesne assignments, to the United States of America as represented by the Secretary of War Application December 10, 1945, Serial No. 634,080

1 Claim. (Cl. 343—5)

This invention relates generally to electrical apparatus and more particularly to radio responder beacons in aircraft.

In the control of air traffic by the use of a radio object detection apparatus on the ground, it is particularly desirable to provide continuous indication of the altitude of the aircraft being controlled. It is an object of this invention to provide such continuous altitude indication by means of a beacon carried by each such aircraft.

Figure 1:
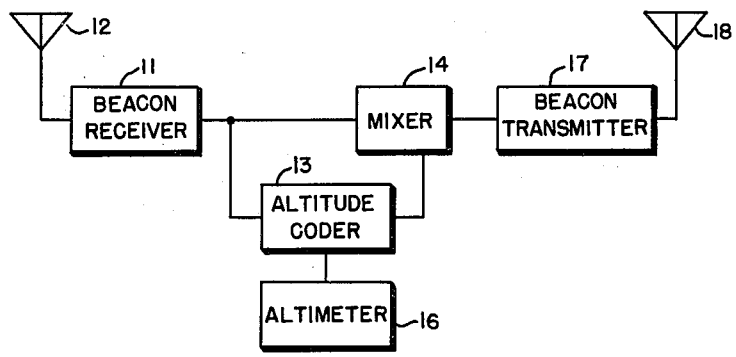
Figure 2:
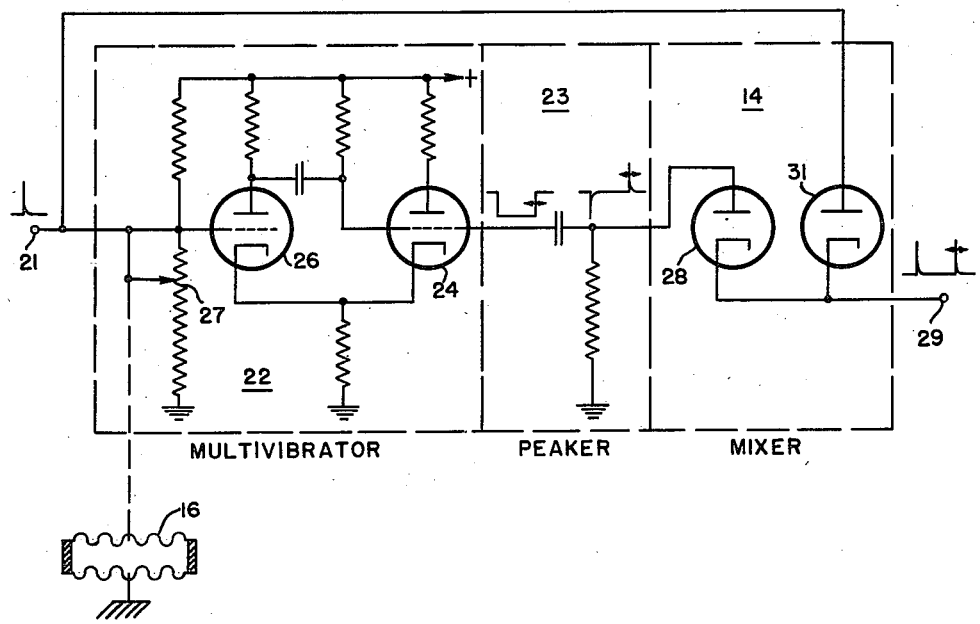

Other objects, features and advantages of this invention will suggest themselves to those skilled in the art and will become apparent from the following description of the invention taken in connection with the accompanying drawing in which:

Fig. 1 is a block diagram of a radio responder beacon embodying the principles of this invention; and Fig. 2 is a schematic wiring diagram of this invention.

Reference is now made more particularly to Fig. 1 in which beacon receiver 11 is connected to antenna 12 and to altitude coder 13 and mixer 14. Altitude coder 13 is connected to altimeter 16 and mixer 14, and beacon transmitter 17 connects to mixer 14 and antenna 18.

Beacon receiver 11 receives radio-frequency interrogating pulses from the radio object detection apparatus on the ground, through the medium of antenna 12, and supplies video pulses to mixer 14 and to altitude coder 13. Altitude coder 13 produces a second video pulse which is delayed after the pulse from receiver 11 by an amount determined by altimeter 16. Altitude coder 13, which will be described below in greater detail, supplies the delayed pulse to mixer 14, which may be any of several mixers well known to those skilled in the art. Both the original pulses from receiver 11 and the delayed pulses from altitude coder 13 are applied to transmitter 17, causing it to emit pairs of pulses of radio-frequency energy through the medium of antenna 18, the pulses of each pair being separated in time by an amount proportional to the altitude of the aircraft.

Referring now more particularly to Fig. 2 for an illustration of the altitude coder 13, the pulses from beacon receiver 11 are applied at terminal 21. Altitude coder 13 may include any convenient means for producing a voltage pulse which is delayed after an initial pulse by an amount proportional to the altitude of the aircraft. In the preferred embodiment herein shown and described, this means consists of a multivibrator 22, of the type shown and described in the application by Britton Chance, Serial No. 512,931, filed December 4, 1943, Patent No. 2,562,660, granted July 31, 1951, followed by a derivative circuit or peaker 23, which is well known in the art. As described in the application cited, multivibrator 22 has a stable condition of equilibrium in which tube 24 conducts, and an unstable condition in which tube 26 conducts. The unstable period is initiated by the positive pulse from beacon receiver 11, which is applied to the grid of tube 26, and the duration of the unstable period is linearly propostional to the D. C. potential on the grid of tube 26. Accordingly, potentiometer 27 is arranged to control the D. C. grid potential of tube 26, the sliding contact of potentiometer 27 being driven by altimeter 16. Altimeter 16 is here indicated as being of the aneroid type, although it may be replaced by any altimeter capable of driving potentiometer 27.

The waveform of the voltage appearing at the grid of tube 24 is a negative voltage pulse of approximately rectangular shape, the leading edge of which coincides in time with the reception of a pulse by beacon receiver 11, and the duration of which is proportional to the altitude. This voltage pulse is applied to peaker circuit 23, so that the voltage applied to mixer 14 consists of a short, sharp negative pulse coinciding with the leading edge of the rectangular pulse, followed by a short, sharp positive pulse coinciding with the trailing edge of the rectangular pulse. Only the positive pulse is transmitted by diode 28 to terminal 29, and since the received pulse is similarly transmitted by diode 31, the output voltage at terminal 29 consists of two successive positive voltage pulses separated in time by an amount proportional to the altitude of the aircraft.

As previously described, the beacon transmitter 17 is caused by these pulses to emit corresponding pulses of R. F. energy. When received by the radio object detection apparatus on the ground, these two pulses produce separate traces on the indicating means, so that the operator receives a visual indication of the aircraft altitude, as well as the usual indication of range and azimuth.

While there has been described what is at present considered to be the preferred embodiment of this invention, it will be obvious to those skilled in the art that various changes and modifications may be made therein without departing from the scope of the invention.

The invention claimed is:

An airborne radio responder beacon, including: receiving means receptive of at least one interrogating pulse of radio frequency energy; means for determining the altitude of said airborne beacon; multivibrator means having its input connected to the output of said receiving means, said multivibrator means producing a square wave whenever an energy pulse is coupled to its input; means for differentiating the output of said multivibrator means to produce a delayed output pulse synchronous with the trailing edge of said square wave; transmitting means, having its input coupled to the outputs of both said receiving means and said differentiating means, for transmitting both said interrogating pulse and said delayed pulse; and means coupled between said altitude determining means and said multivibrator means, for varying the duration of said square wave in response to the variations in altitude of said airborne beacon, thereby varying the time difference between the transmitted interrogating and delayed pulses in accordance with said variations in altitude of said beacon.

BEUHRING W. PIKE.

REFERENCES CITED

The following references are of record in the file of this patent:

UNITED STATES PATENTS

| Number | Name | Date |
| --- | --- | --- |
| 2,252,083 | Luck | Aug. 12, 1941 |
| 2,283,919 | Diamond et al. | May 26, 1942 |
| 2,287,786 | Diamond et al. | June 30, 1942 |
| 2,415,359 | Loughlin | Feb. 4, 1947 |
| 2,448,016 | Busignies | Aug. 31, 1948 |
| 2,479,954 | Moore | Aug. 23, 1949 |
| 2,495,737 | Labin et al. | Jan. 31, 1950 |